United States Patent
Nordquist et al.

[11] Patent Number: 6,040,676
[45] Date of Patent: Mar. 21, 2000

[54] PASSIVE ELECTRONIC DAMPING FOR STEP MOTOR

[75] Inventors: Jack Nordquist, Santa Rosa; Mark J. Calahan, Sebastopol; Timothy J. Damiano, Petaluma; Christopher M. Botka, Santa Rosa, all of Calif.

[73] Assignee: Parker-Hannifin Corporation, Cleveland, Ohio

[21] Appl. No.: 08/787,434

[22] Filed: Jan. 22, 1997

Related U.S. Application Data

[60] Provisional application No. 60/010,871, Jan. 31, 1996.

[51] Int. Cl.[7] .................................................. H02P 8/00

[52] U.S. Cl. ................................................. 318/696

[58] Field of Search ............................ 318/696, 685, 318/671

[56] References Cited

U.S. PATENT DOCUMENTS

| | | | |
|---|---|---|---|
| 3,660,746 | 5/1972 | Milek | 318/696 |
| 4,044,291 | 8/1977 | Hughes et al. | 318/696 |
| 4,293,807 | 10/1981 | Foster et al. | 318/696 |
| 4,319,175 | 3/1982 | Leenhouts | 318/696 |
| 4,422,040 | 12/1983 | Raider et al. | 324/158 |
| 4,514,675 | 4/1985 | Matumoto et al. | 318/696 |
| 4,692,679 | 9/1987 | Hujita | 318/696 |
| 4,749,931 | 6/1988 | Kegel et al. | 318/696 |

*Primary Examiner*—William M. Shoop, Jr.
*Assistant Examiner*—Kim Lockett
*Attorney, Agent, or Firm*—Calfee Halter & Griswold

[57] ABSTRACT

Passive electronic damping apparatus for a step motor of the type having a number of phase windings, comprising: a respective transconductance amplifier coupled to each phase winding for producing a phase drive current in the winding in response to a position command; each transconductance amplifier exhibiting an output impedance characteristic; and a circuit for changing the amplifier output impedance to effect motor damping.

18 Claims, 3 Drawing Sheets

PASSIVE ELECTRONIC DAMPING FOR STEP MOTOR

This application claims the benefit of U.S. provisional application Ser. No. 60/010,871, filing date Jan. 31, 1996.

BACKGROUND OF THE INVENTION

This application is related to our co-pending U.S. provisional patent application Ser. No. 08/787,457 for "ACTIVE ELECTRONIC DAMPING FOR STEP MOTOR" filed on even date herewith, the entire disclosure of which is fully incorporated herein by reference.

The invention relates generally to drive control techniques for synchronous motors such as plural drive phase step motors. More particularly, the invention relates to a passive electronic damping feature for such motors.

The general design and operation of a step motor, such as a hybrid permanent magnet synchronous step motor, are well-known. A rotary hybrid machine typically includes a cylindrical rotor which is axially magnetized by an embedded permanent magnet. The rotor is further configured with a number of teeth; commonly fifty teeth are used but other quantities can be selected depending on the particular application requirements. The present invention, however, can also be used with other types of synchronous machines and motors, for example, linear step motors.

Step motor designs also include a stator having a number (typically but not limited to eight) of electromagnetic pole faces which are spaced around the rotor at selected intervals. Each stator pole face presents a toothed pattern to the rotor. When the electromagnets are energized, the induced electromagnetic flux adds to and subtracts from the permanent magnet flux at the various pole faces depending on the rotational position of the rotor. This results in an alignment of the rotor teeth with the stator teeth in stable torque equilibrium at whichever pole faces are carrying the most flux across the rotor-stator gap.

Motion is achieved and maintained by continuously sequencing the electromagnet currents so as to move the location of the stable equilibrium in one direction or another. Torque is excitation and permanent magnet flux crossing the toothed interface between the rotor and stator. In a typical two phase motor, the stator electromagnet windings are grouped into two phases (A and B) and are driven by currents that are in temporal quadrature (the phase A and phase B currents are 90° out of phase with respect to each other). If a particular combination of electromagnetic drive currents (excitation state) is maintained in the various windings, the motor will seek and attempt to hold a particular position due to the presence of a stable torque detent. If the excitation state is changed the rotor is urged to a new position by the resultant torque.

Sustained motion is achieved by continuously sequencing the phase currents through a prearranged set of states. In a typical system, one electrical cycle of the phase currents moves the location of the torque equilibrium through an angle corresponding to one tooth interval. In their aggregate effect, the phase currents represent to the motor a reference position input consisting of a desired position plus an instantaneous position feedback offset.

The rotor attempts to seek the reference position (torque equilibrium or net zero torque condition) as if it were attached to the command by a spring which exerts a restoring torque when the rotor is not at the reference position. Motion or position of the rotor can be analogized to and exhibits the dynamics of a moment of inertia attached to the commanded position by a torsion spring. The stiffness of the "spring" is approximately proportional to the peak phase currents. Such a system, when operated in an uncompensated open-loop mode, exhibits a natural resonance that causes the motor to ring violently in response to step commands. The motor is also inordinately responsive to cyclic torque disturbances that occur in the vicinity of this natural resonance frequency.

Although a step motor will have an intrinsic damping ratio arising from native viscous losses within the motor and any external mechanical system attached to the motor shaft, the intrinsic damping ratio is typically very small and negligible in its effect to reduce the natural uncompensated resonance of the motor.

Since the natural resonance of a motor is typically an undesirable operational characteristic, efforts have been directed to increase the damping ratio by either mechanical means or the use of feedback techniques. For example, viscous friction can be mechanically increased in the motor but at the expense of impeding motor velocity and responsiveness. In a typical feedback arrangement, a feedback signal is obtained using an accelerometer mounted on the output shaft. This signal is then used to adjust the command in an attempt at reducing resonant behavior. Such devices are expensive and rather delicate, yet must be mounted to the rotating shaft (moving reference frame) and communicate with electronics on the stator or other stationary reference frame.

The objectives exist, therefore, to provide apparatus and methods for a purely electronic damping technique to effect a virtual viscosity that will damp a step motor's natural resonant response, without the need for external feedback devices, or mechanical loss mechanisms.

SUMMARY OF THE INVENTION

To the accomplishment of the foregoing objectives, the invention contemplates passive damping apparatus for a step motor of the type having a number of phase windings, comprising: a respective transconductance amplifier coupled to each phase winding for producing a phase drive current in the winding in response to a position (voltage) command; and means for changing the amplifier output impedance to effect motor damping.

The present invention also contemplates the methods embodied in the use of such apparatus, as well as in another embodiment, a method for passive electronic damping of a step motor comprising the steps of:

using a transconductance amplifier to produce phase drive current for a respective motor phase winding; and changing the transconductance amplifier shunt impedance across the phase winding to damp the motor's natural resonant response.

These and other aspects and advantages of the present invention will be readily understood and appreciated by those skilled in the art from the following detailed description of the preferred embodiments with the best mode contemplated for practicing the invention in view of the accompanying drawings.

DETAILED DESCRIPTION OF THE INVENTION

Figure 1:
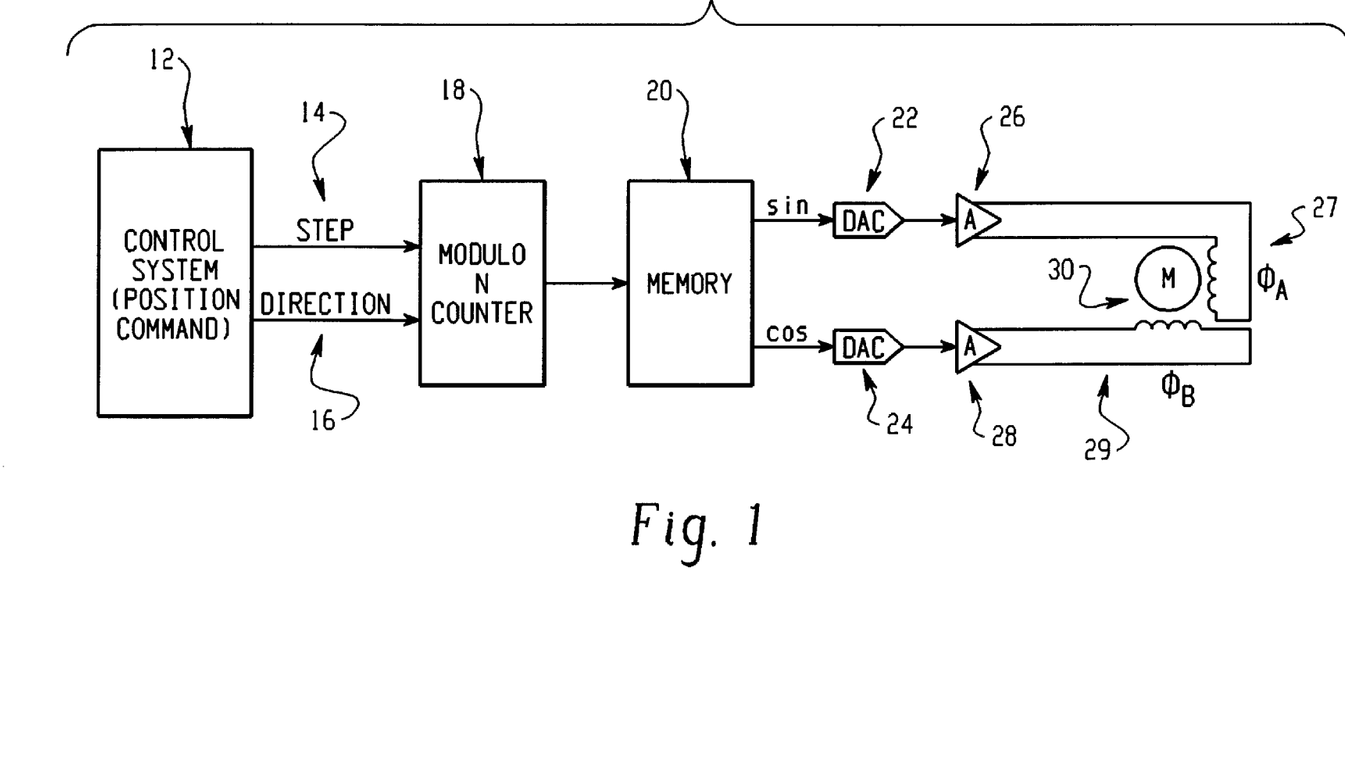
FIG. 1 is a simplified schematic in block diagram form of a control system for a two phase step motor suitable for use with the present invention.

With reference to FIG. 1, the fundamental elements of a control system 10 including a step motor 30 and drive circuits are shown in block diagram form. While the present invention is illustrated and described herein with reference to a rotary step type motor, this is for the purpose of illustration and explanation and should not be construed in a limiting sense. Those skilled in the art will readily appreciate that the invention can be used with different motor and machine designs, including but not limited to linear step motors. From a hardware component standpoint, these elements are well-known and familiar to those skilled in the art. A main controller or host system 12 commands the drive to increment or decrement the motor position 8 via step command signal 14 and direction signal 16. The drive accumulates these incremental commands in an up/down modulo N counter 18. For example, for a two phase 1.8° step motor system with a rotor having 50 teeth and employing 40 microsteps per tooth interval, the counter 18 would have a modulus of 40(2000 microsteps per one rotor revolution). The state of the counter 18 is utilized to "look up" the sine and cosine values for the drive currents used in the two phases of the motor. These values are stored conveniently in a memory 20 such as, for example, a read only memory. The digital sine and cosine signals are input to respective digital to analog converters (DACs) 22, 24 which produce analog current commands to respective transconductance amplifiers 26, 28. The transconductance amplifiers 26, 28 maintain the commanded currents in the phase A and phase B windings 27, 29 of the motor 30. Dynamically, these phase currents cause a torque imbalance which moves the torque detent to the commanded position thus producing the desired rotation of the rotor to the new position.

In such a system 10, the phase A and B drive currents represent to the motor a single reference input, r(t), which is the desired position θ(t) plus the feedback offset φ(t), or:

$$r(t) = \theta(t) + \phi(t) \quad \text{Eq. 1}$$

The rotor attempts to seek the reference position as if it were attached to it by a spring which exerts restoring torque when the rotor is not at the reference position. The stiffness of this spring effect is approximately proportional to the magnitude of phase winding current $I_{max}$ up to a level where the electromagnet poles begin to enter magnetic saturation. In the preferred embodiment, $I_{max}$ is maintained sufficiently below that saturation level so that the electromagnetic circuit remains substantially linear. Under these conditions, the output position, c(t), of the rotor exhibits the dynamics of a moment of inertia which is attached to the commanded position by a torsion spring. Such a system has the transfer ratio $$\frac{C(s)}{R(s)} = \frac{(\omega_n)^2}{s^2 + 2\zeta_c \omega_n s + (\omega_n)^2} \quad \text{Eq. 2}$$

where $\omega_n$ is the undamped, natural angular velocity determined by the square root of the ratio of stiffness to the polar moment of inertia and $\zeta_0$ is the intrinsic damping ratio arising from native, viscous losses within the motor, drive and external mechanical system attached to the motor shaft.

Without resorting to extraordinary mechanical means, $\zeta_0$ may be as low as 0.01. Such a value is so low as to be negligible in most practical applications. According to an important aspect of the invention, a damping ratio of about 0.2 to 0.4 is produced by electronic means without the need for accelerometers or similar devices.

Neglecting $\zeta_0$, the block diagram form for the uncompensated (open loop) motor can be represented as shown by the following transfer ratio:

$$\frac{C(s)}{R(s)} = \frac{(\omega_n)^2}{s^2 + 2\zeta_0 \omega_n s + (\omega_n)^2} \quad \text{Eq. 3}$$

Such a system rings violently and persistently in response to step discontinuities in r(t) or any of its derivatives. Furthermore, the system is inordinately responsive to any cyclic torque disturbances that occur in the spectral vicinity of $\omega_n$. Consequently, the uncompensated motor tends to superimpose a relentless vibration on an otherwise smooth command.

The invention provides methods and apparatus for passive electronic damping by effecting a virtual viscosity in the form of an impedance change in the transconductance amplifier to allow the dissipation of resonant energy, and subsequent reduction in settling time.

Turning now to an exemplary embodiment of an electronic passive damping arrangement it will first be noted that during movement the motor drive amplifiers 26 and 28 (FIG. 1) must produce cyclic currents in the motor windings. The windings, in turn, present inductive reactance and generated EMF (Electro-Motive-Force) so as to oppose the effort of the drive. The generated EMF arises from commutation of permanent magnet flux through various stator pole pieces when the rotor moves. As the speed increases, the generated voltage rises in frequency and amplitude in proportion to velocity. If the rotor maintains synchronism with the drive currents (as it is intended to do), then the generated EMF and the phase currents are at the same frequency.

Figure 2:
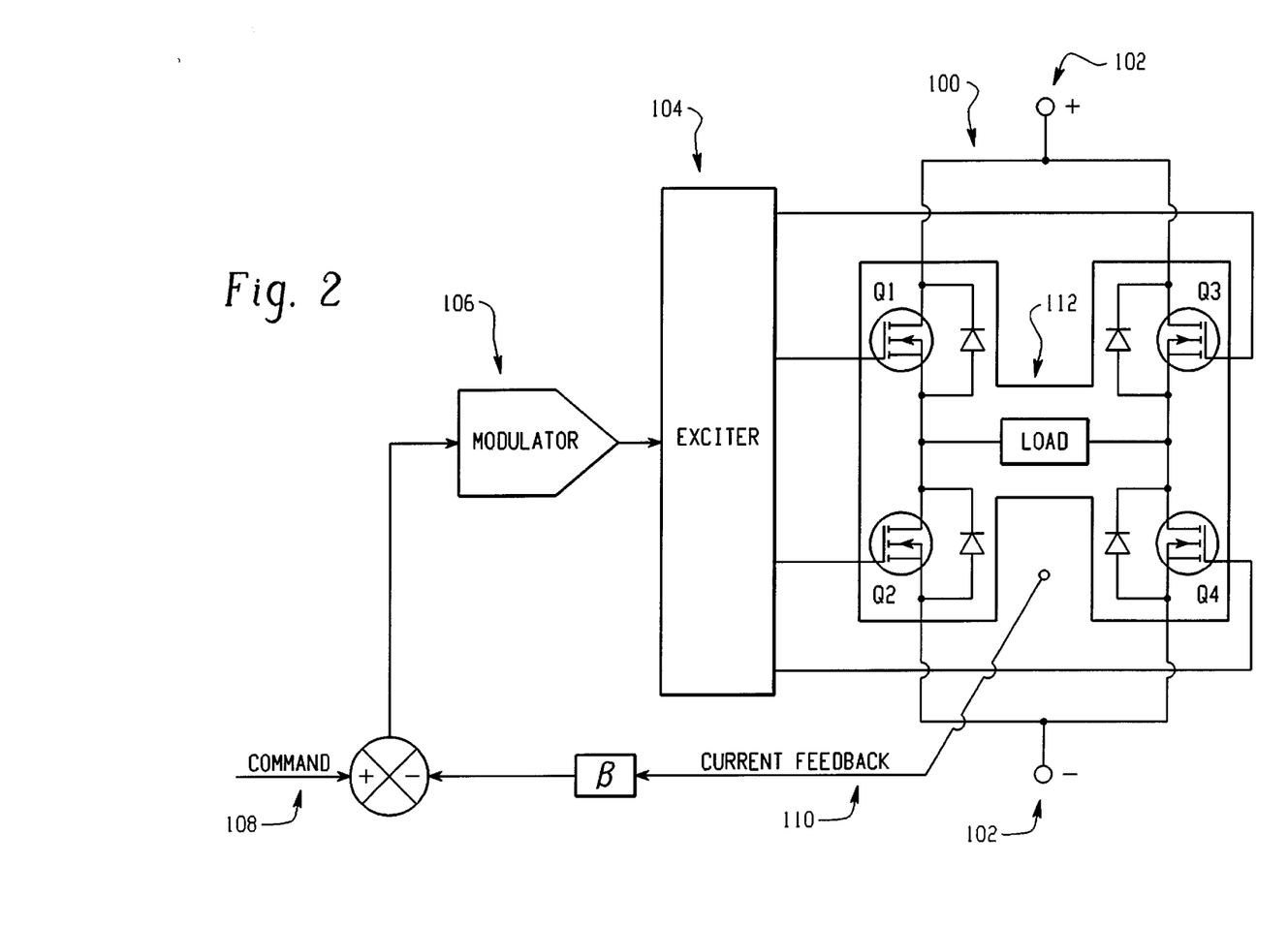
FIG. 2 is a simplified block diagram of a transconductance amplifier suitable for use within a step motor drive.

The inductive reactance increases in proportion to frequency and therefore more voltage is needed to maintain the desired current amplitude. To that end, each transconductance amplifier contains a local feedback loop which continuously compares output current with the command input to produce an error signal, (FIG. 2). The error signal is amplified and applied as a voltage across the motor winding.

Thus, each transconductance amplifier 26,28 is a linear feedback system which possesses a certain bandwidth and will react not only to its command input but also to the voltage generated in the motor windings when the permanent magnet rotor moves.

The nature of that interaction can have beneficial or detrimental effects on motor movement depending upon the configuration of the control loops within the transconductance amplifiers. The motor is highly resonant and, therefore, quite sensitive to even the most subtle interactions between its generators and the drive electronics in the transconductance amplifiers. Such interaction actually comprises a feedback loop which acts on and is influenced by the position of the rotor. Since an uncompensated motor already exhibits the highly undamped resonant dynamics of the rotor, stability problems are further encountered from such a feedback loop around the system.

As previously noted herein, a step motor seeks a commanded position as if the rotor were attached to the command by a spring. The stable position is one where torque equilibrium is achieved, commonly known as the operating torque detent, which occurs at each zero crossing with a negative slope along the operating torque detent wave, (torque versus displacement curve). However, such a system has a natural undamped resonance $\omega_n$, and in response to a unit step command r(t) has a response c(t) defined by the following equation:

$$c(t)=1-\exp(-\zeta\omega_n t)\sin(\omega_d t+\eta) \qquad \text{Eq. 18}$$

where $$\omega_d = \omega_n\sqrt{(1-\zeta^2)} \text{ and } \eta = \cos^{-1}(\zeta) \qquad \text{Eq. 19}$$

The exponentially decaying term in Eq. 18 is the most troublesome aspect of resonance. It results in ubiquitous and persistent ringing which continues past the intended end of a move or velocity transition. This behavior also represents a large amount of activity which requires the motor to exert additional force over and above the requirements of the intended move.

As noted herein, adding viscous friction to the motor, such as fluid surrounding the rotor, can passively damp the resonant response. However, to achieve a damping ratio of 0.2 to 0.4 using this approach would impose an excessive frictional torque demand. Most of the developed torque would be spent simply shearing the fluid to get movement. The present invention takes an entirely different approach by electronically realizing a sort of virtual viscosity which operates to damp ringing but does not actually apply physical friction to the rotor. The analysis begins where the motor is attached to the drive, i.e. the amplifier output terminals.

It is common to think in terms of something delivered from amplifiers to loads, e.g. power, voltage, and current. But, what has not been appreciated before is how to take advantage of the aspect that all of these things freely flow back and forth between the load (motor) and the amplifier (drive). The generator in the motor is a seat of EMF just as the power supply in the drive. The two sources are connected to each other via the series combination of winding inductance and a small amount of resistance.

The present invention takes into consideration the type of load the motor sees when it exhibits operation as a generator during movement.

A step motor rotor that is ringing is continuously exchanging energy between potential (stretched spring) and kinetic (high velocity) forms. If the voltage generated in the stator windings by this activity can be placed across a resistance, then energy will flow from the generator into the resistance and be dissipated. The energy will come from the oscillating load which means the load vibrations will decay more rapidly. This amounts to the sought after virtual viscosity. Placing the generator across a reactance will not result in such viscosity because an AC generator does not exchange average power with a reactance. Unfortunately, there is already a fairly large reactance (motor inductance) in series with the motor's generators. However, by making the amplifier 26,28 present itself to the motor as a capacitor in series with a resistor and by choosing the capacitor's reactance to match (conjugately) the inductor's reactance, the net impedance will appear to be substantially pure resistance connected across the internal generator inside the motor.

A transconductance amplifier is an electronic system that produces output current which is proportional to an input voltage command. The gain of such an amplifier is measured in amps/volt or conductance (mhos or siemens). The device is generally realized by enclosing a voltage amplifier in a high gain loop which measures load current and compares it with a command voltage. The action of the loop attempts to maintain the output current at the commanded level.

In general the voltage amplifier should be capable of making large voltage excursions while simultaneously supplying large current. This high volt-ampere requirement makes it quite advantageous to utilize switchmode (chopper) technology for the output section. A strictly linear amplifier incurs large losses in this type of service whereas the chopper is very efficient.

FIG. 2 shows a simplified block diagram of such a scheme. A two phase step motor drive would contain two such amplifiers 26, one for each phase. The switchmode output section is formed from an "H" bridge 100 which employs four solid-state switches Q1–Q4 (MOSFETs, IGBTs, or BJTs) and four diodes so as to be able to apply the supply voltage 102 to the motor load 112 in either polarity, depending upon which switches are closed. The details of safely operating the gates of the transistors Q1–Q4 are handled in an exciter 104. The exciter 104 may be of conventional design known to those skilled in the art.

The exciter 104 receives commands from a modulator 106 as to which switches to turn on. The signals from the modulator may be, for example, Pulse Width Modulated (PWM) carriers (one for each side of the bridge). The carrier frequency is typically 20 KHz or greater. The modulator 106 produces the PWM modulation so as to apply an average voltage across the load in proportion to an error signal obtained by differencing the commanded current 108 and measured current 110 signals.

The current feedback signal 110 can be developed by conventional means well-known to those skilled in the art and is assumed to have an associated gain factor beta ($\beta$). It should be noted that the current feedback is a signal that represents the load current, which in this case is the phase current in the corresponding motor phase winding connected to the amplifier 26 output.

Figure 3:
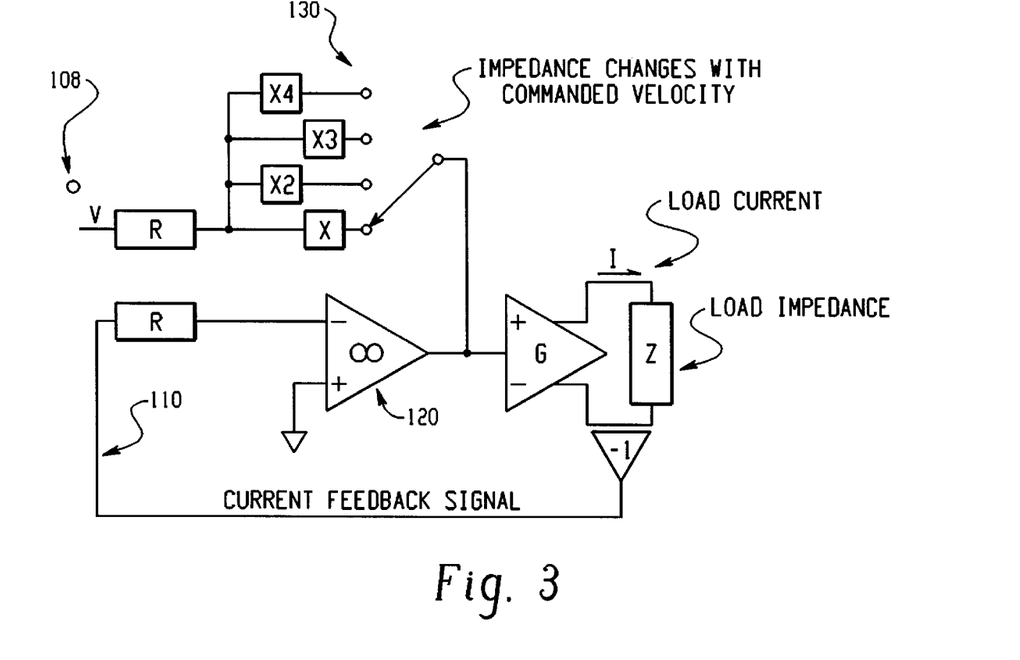
FIG. 3 is another block diagram of a transconductance amplifier such as shown in FIG. 2.

The general transconductance amplifier 26 arrangement of FIG. 2 can be drawn in more detailed form as in FIG. 3.

FIG. 3 shows the modulator 106, exciter 104 and output section 100 of FIG. 2 combined into a single block of gain, G. The phase of $\beta$ has been inverted and its gain set to unity (1) for simplicity. The command 108 and feedback signal voltages 110 are converted to currents by two resistors (R) and differenced at the virtual ground (–) of an operational amplifier 120. The difference is then turned back into a voltage by flowing through an impedance, X, in the operational amplifier's feedback path. The operational amplifier 120 can be assumed to have infinite gain. By inspection, the enclosed loop transfer function from V to I is:

$$I(s)=-V(s)[GX/(RZ+GX)] \qquad \text{Eq. 19}$$

Figure 4:
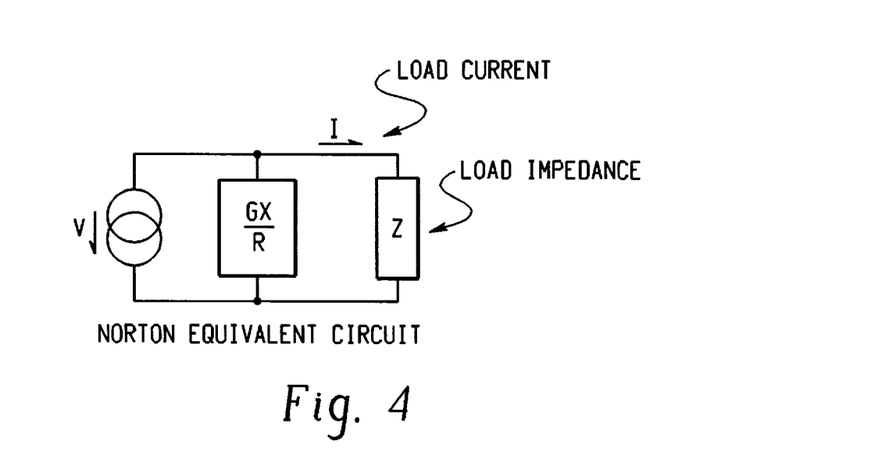
FIG. 4 is a representation of a Norton equivalent circuit of an ideal current source driving a load.

Now consider the circuit of FIG. 4. Shown is an ideal current source (equal to the command voltage, V, driving the parallel combination of the load, Z, and a shunt impedance, GX/R. Again from inspection, the transfer function from V to I can be defined as follows. The current, I, is found by multiplying V by the ratio of the parallel impedance combination to Z.

$$I=[-V[(R/GX)+(1/Z)]^{-1}]/Z=-V[GX/(RZ+GX)] \qquad \text{Eq. 20}$$

Note that Eq. 20 and Eq. 19 are precisely the same expressions. This shows that the circuit of FIG. 4 is the Norton equivalent of the transconductance amplifier 26 as seen at its output terminals. The equivalent circuit accurately models and predicts all linear behavior. It also affords a concise view of what the motor sees looking back into the terminals of the drive.

Aside from attempting to maintain the commanded current in its load, the transconductance amplifier 26 also places a shunt impedance, GX/R, across its output terminals. An ideal current source, of course, has infinite impedance.

So, by manipulating G, X and R, one can control the value of the shunt element and provide a means of extracting power from the motor's internal generators. At the end of a move, for instance, when the rotor is expected to continue ringing, the loop parameters can be modified to cause the shunt to appear as a capacitance in series with a resistance. The capacitance is selected to resonate with the winding inductance at a frequency near the natural resonant frequency of the mechanical system of the rotor and accompanying load. Then the real part of the shunt (resistance) acts as a dissipative process across the internal generators. The power to feed the "dissipation" comes from the vibrating rotor and thereby introduces viscosity into the mechanical system. As the motor velocity is increased, the loop parameters (G, X and R) are changed to cause the shunt to assume high impedance and give the system wide bandwidth, so that it can accommodate the higher speed cyclic drive currents.

It is worth noting that "losses" in the real part of the shunt element, GX/R, are not really consumed in a dissipative process. There is not an actual, physical resistor across the output of the amplifier. Rather, the resistance is synthesized from reaction within the current control loop, and any apparent dissipation is really mediated by extracting energy from the winding circuit and transferring it to the bridge power supply. Nonetheless, the effect on the mechanical system is indistinguishable from that produced by an actual viscous loss mechanism. What now remains is to quantify the behavior so that one may synthesize a combination of X, G and R which will produce useful results.

Second Order Decay

Assume for analysis purposes that a step motor comes to rest (velocity=0) near its final equilibrium position. If zero velocity occurs at the equilibrium position, the rotor will remain at rest. If the rotor is not at equilibrium but, rather, at some displacement, $\Delta$, then the state vector $\{c=\Delta$ and $v=0\}$ represents the initial conditions of an ensuing natural response which will have the form $$c(t)=A[\exp(-\zeta\omega_n t)\sin(\omega_d t+\eta)] \quad \text{Eq. 21}$$

where $$A = \Delta / \sqrt{(1-\zeta^2)} \text{ and } \eta = \cos^{-1}(\zeta)$$

The subsequent velocity, v(t), will, of course, be the derivative of Eq. 21. We are using the symbol, v, for angular velocity instead of $\omega$ to avoid confusion with the angular frequency of cyclic phenomena. Now, if $\zeta$ were due to a mechanical, viscous loss mechanism, then we could write $$\zeta = b / [2\sqrt{(k_s J)}] \quad \text{Eq. 22}$$

where b is the coefficient of friction, $k_s$ is the stiffness, and J is the total inertia. When b is present, it creates a torque (drag) in proportion and opposition to velocity.

$$T_v = -bv \quad \text{Eq. 23}$$

In passive damping the resistive shunt allows currents to flow in the winding which produce retarding torque that mimics viscous friction. We will now develop an expression for that apparent friction in terms of motor parameters.

For simplicity, assume that the motor is stopped with zero current in phase A and current, $I_B$, in phase B. If the torque constant of the motor is $k_T$, then the stiffness is $$k_s = 50 k_T I_B \quad \text{Eq. 24}$$

When the motor makes small excursions around equilibrium, the voltage induced by PM flux in phase A is $$e = -v k_T \quad \text{Eq. 25}$$

With the inductance "tuned out" by the negative reactance (capacitance) of the shunt, the voltage appears across the real part of the shunt impedance, $R_s$, and current flows in phase with e according to ohm's law.

$$I_s = e/R_s = -v k_t / R_s \quad \text{Eq. 26}$$

The resulting torque is $$T_v = I_s k_T = -v(k_T)^2 / R_s \quad \text{Eq. 27}$$

which has the same form as Eq. 23 above with $$b = (k_T)^2 / R_s \quad \text{Eq. 28}$$

which proves to be dimensionally correct. Substituting from Eq. 28 and Eq. 24 into Eq. 22 gives $$\zeta = (k_T)^2 / [2 R_s \sqrt{(50 k_T I_B J)}] \quad \text{Eq. 29}$$

which is dimensionless; as it should be. Solving for R $$R_s = (k_T)^2 / [2\zeta \sqrt{(50 k_T I_B J)}] \quad \text{Eq. 30}$$

Equation 30 provides the value of the real part of the shunt impedance that will achieve the desired damping ratio in a motor with the specified parameters.

Example

Consider a typical 34 frame, 2-stack step motor with the following parameters.

| | |
|---|---|
| $k_T$ | 0.725 volt-sec |
| J | 120E-6 kg-m² |
| L | 15 mHy |
| $I_B$ | 2.9 amp |
| $\zeta$ | 0.2 |
| | and desired From Eq. 30 |

$$R_s = (.725)^2 / [2(.2)\sqrt{(50 \cdot 0.725 \cdot 2.9 \cdot 120E-6)}] = 11.7\Omega$$

From Eq. 24 the stiffness is $$k_s = 50 \cdot 0.725 \cdot 2.9 = 105 \; nt \cdot m \cdot rad^{-1}$$

and the mechanical resonance is at $$\omega_n = \sqrt{[105/(120E-6)]} = 935 \; rad \cdot sec^{-1}$$

The winding reactance at that angular frequency is $$X_L = 935 \cdot 0.015 = 14 \Omega$$

Finally, the shunt capacitance required for resonance is $$C_S = 1/(14 \cdot 935) = 76 \; \mu f$$

So, 11.7 ohms of resistance in series combination with 76 μf of capacitance forms the required shunt. To synthesize this in the output of the transconductance amplifier, we return with these values to FIG. 4 where it is shown that the shunt impedance is $$Z_s = (GX)/R \qquad \text{Eq. 31}$$

We choose a value of 30KΩ for R and form X from convenient sized components with the same time constant as the desired $Z_s$; 0.1 μf and 8.9 KΩ. From Eq. 31 it is determined that $$G/R = 11.7/8.9K = 1.31E-3$$

Therefore, G is calculated as $$G = 30E-3 \cdot 1.31E-3 = 39$$

With the amplifier setup as described in the previous example, the bandwidth of the amplifier will be $$BW = 935/2\pi = 150 \; Hz$$

So, the motor may be operated up to about 3 rps before the amplifier must be modified. Beyond that speed the motor current will fall precipitously. Therefore, automatic circuitry can be used to detect a suitable transition speed and increase the value of G so as to give the amplifier sufficient bandwidth to accommodate higher frequency phase currents.

The actual implementation of the passive damping concept as taught herein will depend on the specific transconductance amplifier design selected for each application. The invention is not limited to any particular amplifier design. In one embodiment, as for example in FIG. 3, we have found that conventional analog switches 130 can be used to change the amplifier gain, G, by switching in passive components or impedances (represented by elements X, X2, X3 and X4 in FIG. 3) that change the gain as needed, based on the motor speed. Another embodiment would prescribe the use of a digitally based current control loop and/or damping circuit using a form of programmable processor such as, but not limited to, a digital signal processor or RISC based processor. The amplifier output impedance could be adjusted real-time to allow for consistent damping over a wide range of motor velocities. Such a system would also be well suited for machine characterization, in which specific amplifier gains could be adjusted real-time in accordance with known dynamic system parameters.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. Passive damping apparatus for a step motor of the type having a number of phase windings, comprising: a respective transconductance amplifier coupled to each phase winding for producing a phase drive current in the winding in response to a position command; each transconductance amplifier exhibiting an output impedance including a capacitive reactance and a dissipative resistance in shunt with the phase winding impedance; and means for changing said amplifier output impedance to dissipate resonant energy to effect motor damping.

2. The apparatus of claim 1 further comprising sensing means for producing an output related to motor speed; said changing means being responsive to said sensing means output.

3. The apparatus of claim 1 wherein said changing means changes a gain characteristic of said transconductance amplifier resulting in an output impedance change.

4. The apparatus of claim 3 wherein said transconductance amplifier gain characteristic is changed in response to the motor speed dropping below a threshold value.

5. The apparatus of claim 1 wherein said changing means switches said transconductance amplifier output impedance to exhibit a capacitive reactance closely matched to inductive reactance of said amplifier's respective phase winding at the natural resonant frequency of the motor and load.

6. The apparatus of claim 1 wherein said amplifier output impedance is changed at low motor speeds and electronically simulates mechanical damping.

7. The apparatus of claim 1 wherein said changing means changes a gain characteristic of said transconductance amplifier to produce an output impedance thereof that includes a capacitive reactance closely matched (conjugately) to the phase winding inductive reactance and a resistive impedance that dissipates resonant energy related to back EMF of the motor and that is exchanged between the motor and said amplifier.

8. The apparatus of claim 1 wherein said transconductance amplifier comprises a load current feedback control amplifier.

9. The apparatus of claim 1 wherein said transconductance amplifier output impedance exhibits a capacitive reactance and dissipative resistance at low motor speeds, with said capacitive reactance being closely matched to reactance of the phase winding at the natural resonant frequency of the motor and load.

10. The apparatus of claim 1 wherein said transconductance amplifier output impedance appears as a shunt impedance to the motor phase winding, and further wherein said changing means causes said shunt impedance to function as a capacitive reactance in series with a dissipative resistance.

11. The apparatus of claim 10 wherein said changing means causes said output impedance change in response to the motor speed dropping below a threshold value.

12. A method for passive electronic damping of a step motor comprising the steps of:

using a transconductance amplifier to produce phase drive current for a respective motor phase winding; the amplifier having a capacitive reactance and dissipative resistance impedance in shunt with the phase winding; and changing the transconductance amplifier shunt impedance across the phase winding to dissipate resonant energy to damp the motor's natural resonant response.

13. The method of claim 12 further comprising the step of detecting when the motor speed drops below a threshold value and changing said shunt impedance in response to said detected speed change.

14. The method of claim 13 wherein the step of changing the transconductance amplifier shunt impedance comprises the step of closely matching a capacitive shunt reactance of the amplifier to the winding inductive reactance at the natural resonant frequency of the motor and load.

15. The method of claim 14 wherein the step of changing the gain characteristic of the transconductance amplifier results in a change in said shunt impedance in response to said speed change.

16. The method of claim 12 further comprising the step of damping the motor's response by dissipating resonant energy related to back EMF of the motor exchanged between the motor winding and said shunt impedance.

17. Apparatus for damping response of a step motor comprising: transconductance amplifier means for producing phase drive current in each of a plurality of motor phase windings; passive electronic damping means for changing said amplifier means output impedance at lower motor speeds to damp the motor response.

18. The apparatus of claim 7 wherein said resistive impedance is defined in part by the following equation:

$$R_s = (k_T)^2 / \left[ 2\zeta \sqrt{(50 k_T I_B J)} \right]$$

* * * * *

UNITED STATES PATENT AND TRADEMARK OFFICE
CERTIFICATE OF CORRECTION

PATENT NO. : 6,040,676
DATED : March 21, 2000
INVENTOR(S) : Jack Nordquist, et. al.

It is certified that error appears in the above-indentified patent and that said Letters Patent is hereby corrected as shown below:

Title page, item [75], inventors: change Mark J. Callahan to -- Mark C. Callahan--

Signed and Sealed this

Thirteenth Day of March, 2001

Attest:

NICHOLAS P. GODICI

Attesting Officer    Acting Director of the United States Patent and Trademark Office